July 1, 1930. A. KOSIAN 1,768,613
ADJUSTABLE HEADLIGHT
Filed Aug. 13, 1929 2 Sheets-Sheet 1
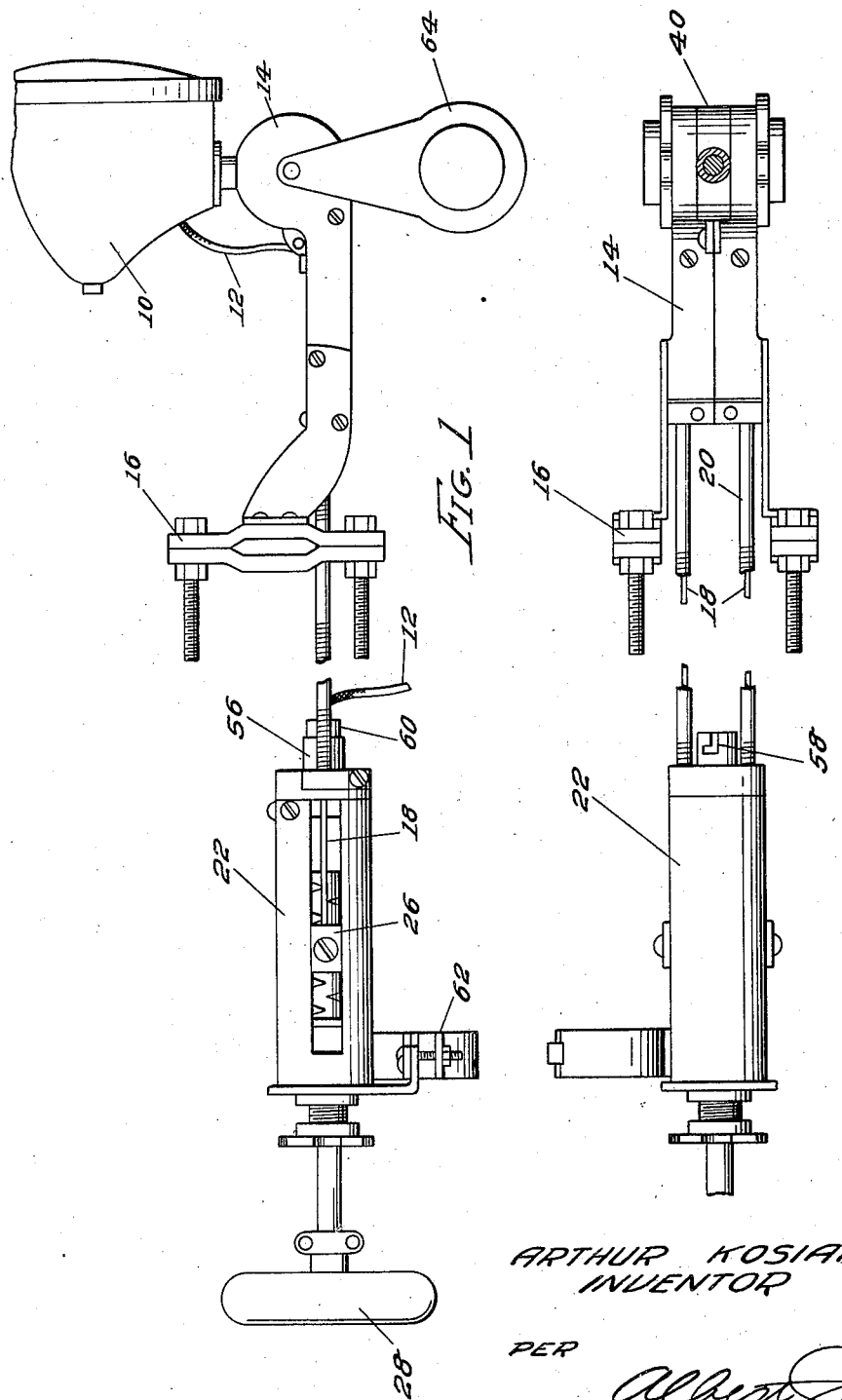
ARTHUR KOSIAN
INVENTOR
PER
Albert J. Fihe
ATTORNEY

ARTHUR KOSIAN
INVENTOR

PER
Albert J. Fike
ATTORNEY

Patented July 1, 1930

1,768,613

UNITED STATES PATENT OFFICE

ARTHUR KOSIAN, OF CHICAGO, ILLINOIS

ADJUSTABLE HEADLIGHT

Application filed August 13, 1929. Serial No. 385,494.

This invention relates to improvements in adjustable headlights and has for one of its principal objects the provision of means whereby a headlight or search light for automobiles or the like may be positively controlled from the dash or from some other remote point.

One of the important objects of this invention is to provide an adjustable headlight for automobiles or the like, which by the operation of a stick handle or lever can be moved in any direction either horizontally or vertically, and at any desired angle therebetween, either simultaneously of consecutively.

Still another and further important object of this invention is to provide a dirigible searchlight for automobiles, preferably mounted at the front of the car and controlled from the dash which in addition to including a single lever for manipulating the same in all directions, also includes a control switch in the lever for supplying current to the lamp itself.
Other and further important objects of the invention will be apparent from the disclosures in the accompanying drawings and following specification.

The invention, in a preferred form, is illustrated in the drawings and hereinafter more fully described.

In the drawings:

Figure 1 is a side elevation of the improved adjustable headlight of this invention.

Figure 2 is a top plan view of the same, parts being omitted.

As shown in the drawings:

Figure 3:
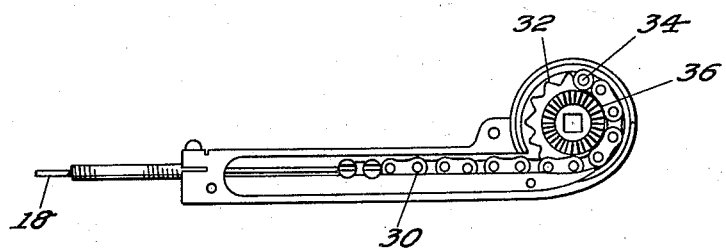
Figure 3 is a central vertical section of the lamp mounting showing the operating features.

The reference numeral 10 indicates generally a lamp casing having the usual current supplying wire 12, the lamp casing itself being pivotally mounted in a support 14 which in turn has brackets 16 attached thereto for convenient positioning of the lamp upon the front crossbar or the like of an automobile.

As best shown in Figure 2, the flexible operating wires 18 extend rearwardly from the casing 14, these being slidably mounted in the usual flexible shafts 20. These wires continue up through the hood of the automobile and connect with the dash control equipment comprising mainly a cylindrical casing 22 which has mounted therein a double acting screw 24, the casing itself being provided with slots in which wire control elements 26 slide. These wire control elements are mounted upon the threads of the screw member 24, and a revolution of the handle 28 in one direction will move one of the wire control elements 26 forwardly and the other rearwardly, this motion being reversed upon a reverse turning of the handle 28.

Figure 4:
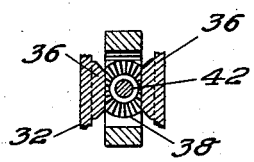
Figure 4 is a detail view illustrating the differential means for moving the lamp in a vertical plane.
Figures 5, 6:
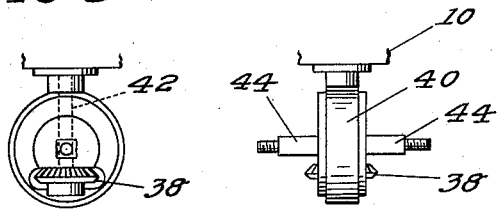
Figure 5 is a detail side view of the lamp support.
Figure 6 is an end view of the same showing the pivotal mounting.
Figure 7:
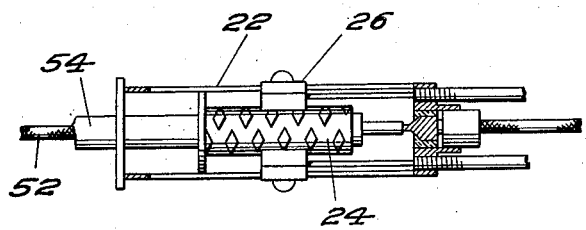
Figure 7 is a detail view of the double-threaded screw for effecting differential motion.
Figure 8:
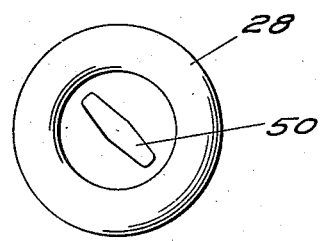
Figure 8 is an end view of the operating handle showing the light control switch.

The forward end of each of the wires 18 is connected to a chain 30, the other end of which is mounted on a sprocket wheel 32 and attached thereto at the point 34. There are two of these sprocket wheels, one positioned on each side of the forward end of the casing 14 and each of the sprocket wheels has formed integral therewith, or attached thereto, a bevel gear 36. These bevel gears 36 in turn each mesh with a similar bevel gear 38 mounted horizontally in a lamp support element 40 which is fitted into a slot in the end of the casing 14. As best illustrated in Figures 4, 5, and 6, the combination of the two gears 36 and the gear 38 forms a differential arrangement, and a shaft 42 extends upwardly from the gear 38 which forms a pivotal mounting for motion of the lamp in a horizontal plane.

A pair of pins 44 extends outwardly from the lamp support element 40 and forms a pivotal support for movement of the lamp in a vertical plane.

The double-threaded screw 24 is slidably mounted in a casing 22, and an inward or outward motion of the handle 28 will move the screw correspondingly and force the wires 18 with the attached chains 32 forwardly or rearwardly, thereby turning the sprocket wheels 32. The chains 30 are mounted in the casing in suitable slides so as to prevent buckling. Obviously, this turning motion of the sprockets 32 together with the attached gears 36 will impart a corresponding movement to the bevel gear 38 and rotate the element 40 about the pivot pins 44, thereby moving the lamp in a vertical plane. A turning movement of the handle 28 imparts a forward action to one of the wires 18 through its connection 26 and a rearward action to the other wire whereby one of the sprocket and gear wheels 32—36 is rotated in one direction and the other in the other direction, causing a turning movement of the differential gear 38 and imparting movement in a vertical plane to the lamp 10 through its pivotal mounting 42. Naturally, this inward or outward movement and the turning motion can be imparted to the handle 28 simultaneously if desired.

A current control switch 50 is mounted in the end of the handle 28, and operates a shaft 52 passing through the hollow shaft 54 forming the connection between the handle 28 and the sleeve 22, and at the inner end of the sleeve 22 is mounted an electric light socket 56 having the usual bayonet slot and connections 58 for the insertion of a plug 60 in which is mounted the other end of the wire 12. Turning of the switch 50 merely brings two points into contact closing the circuit through the usual ground connection. This feature may be changed as necessary or desirable.

A suitable bracket 62 is provided adjacent the sleeve 22 for connection of the device to the steering post of an automobile if desired, and a pair of counter-weights 64 may be mounted upon the outer ends of the pivot pins 44 so as to help maintain the lamp in an upright position in the event that the friction between the connections is insufficient.

It will be obvious that herein is provided a dirigible headlight for automobiles which has very simple control comprising only two operating wires while at the same time the apparatus provides for free motion in both vertical and horizontal planes and at the same time allowing for a very considerable range of such motion.

I am aware that many changes may be made, and numerous details of construction varied throughout a wide range without departing from the spirit of this invention, and I therefore do not purpose limiting the patent granted hereon otherwise than as necessitated by the prior art.

I claim as my invention:

1. An adjustable headlight mounted for motion in two planes and a single remote control therefor, said remote control comprising a pair of flexible shafts, and a differential gear construction at one end of the shafts and a double-threaded screw at the other ends.

2. An adjustable headlight mounted for motion in two planes and a single remote control therefor, said remote control comprising a pair of flexible shafts, and differential gear construction at one end of the shafts and a double-threaded screw at the other ends, said differential gear construction including sprockets and chains for operating said gears.

3. An adjustable headlight mounted for motion in two planes and a single remote control therefor, said remote control comprising a pair of flexible shafts, and differential gear construction at one end of the shafts and a double-threaded screw at the other ends, said double-threaded screw construction including a sleeve in which the screw is mounted and riders for the screw slidably mounted in the slots in the sleeve.

4. An adjustable headlight mounted for motion in two planes and a single remote control therefor, said remote control comprising a pair of flexible shafts, and differential gear construction at one end of the shafts and a double-threaded screw at the other end, said differential gear construction including sprockets and chains for operating said gears, said double-threaded screw construction including a sleeve in which the screw is mounted and riders for the screw slidably mounted in the slots in the sleeve.

5. An adjustable headlight mounted for motion in two planes and a single remote control therefor, said remote control comprising a pair of flexible shafts, and differential gear construction at one end of the shafts and a double-threaded screw at the other end, said differential gear construction including sprockets and chains for operating said gears, said double-threaded screw construction including a sleeve in which the screw is mounted and riders for the screw slidably mounted in the slots in the sleeve, said flexible shafts to be connected at one end to the screw riders, and at the other end to the sprocket chains.

6. An adjustable headlight mounted for motion in two planes and a single remote control therefor, said remote control comprising a pair of flexible shafts, and differential gear construction at one end of the shafts and a double-threaded screw at the other end, said differential gear construction including sprockets and chains for operating said gears, said sprocket chains being fixed to the sprockets at one point and mounted for motion therewith without buckling.

7. An adjustable headlight mounted for motion in two planes and a single remote control therefor, said remote control comprising a pair of flexible shafts, and differential gear construction at one end of the shafts and a double-threaded screw at the other end, said differential gear construction including sprockets and chains for operating said gears, said double-threaded screw construction including a sleeve in which the screw is mounted and riders for the screw slidably mounted in the slots in the sleeve, said flexible shafts to be connected at one end to the screw riders, and at the other end to the sprocket chains, and an operating handle for the lamp positioned at the rear of the screw-containing sleeve and mounted for both slidable and turning motion therein.

8. An adjustable headlight mounted for motion in two planes and a single remote control therefor, said remote control comprising a pair of flexible shafts, and differential gear construction at one end of the shafts and a double-threaded screw at the other end, said differential gear construction including sprockets and chains for operating said gears, said double-threaded screw construction including a sleeve in which the screw is mounted and riders for the screw slidably mounted in the slots in the sleeve, said flexible shafts to be connected at one end to the screw riders, and at the other end to the sprocket chains, and counter-weights for the lamp.

9. An adjustable headlight mounted for motion in two planes and a single remote control therefor, said remote control comprising a pair of flexible shafts, and differential gear construction at one end of the shafts and a double-threaded screw at the other end, said differential gear construction including sprockets and chains for operating said gears, said double-threaded screw construction including a sleeve in which the screw is mounted and riders for the screw slidably mounted in the slots in the sleeve, said flexible shafts to be connected at one end to the screw riders, and at the other end to the sprocket chains, and an operating handle for the lamp positioned at the rear of the screw-containing sleeve and mounted for both slidable and turning motion therein, current carrying means for the lamp, and a switch in the handle for controlling said current carrying means.

10. An adjustable headlight mounted for motion in two planes and a single remote control therefor, said remote control comprising a pair of flexible shafts, and differential gear construction at one end of the shafts and a double-threaded screw at the other end, said differential gear construction including sprockets and chains for operating said gears, said double-threaded screw construction including a sleeve in which the screw is mounted and riders for the screw slidably mounted in the slots in the sleeve, said flexible shafts to be connected at one end to the screw riders, and at the other end to the sprocket chains, and an operating handle for the lamp positioned at the rear of the screw-containing sleeve and mounted for both slidable and turning motion therein, current carrying means for the lamp, and a switch in the handle for controlling said current carrying means, said switch comprising a rod passing through the shaft down the handle and the double-threaded screw and terminating in a lamp socket connection at the forward end of the sleeve.

In testimony whereof I affix my signature.

ARTHUR KOSIAN.